US006572938B2

(12) United States Patent
Yanai et al.

(10) Patent No.: US 6,572,938 B2
(45) Date of Patent: Jun. 3, 2003

(54) LIQUID CRYSTAL COMPOSITION AND LIQUID CRYSTAL DISPLAY DEVICE

(75) Inventors: Motoki Yanai, Chiba (JP); Yasuhiro Kubo, Chiba (JP); Etsuo Nakagawa, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 09/773,536

(22) Filed: Feb. 2, 2001

(65) Prior Publication Data

US 2002/0066887 A1 Jun. 6, 2002

(30) Foreign Application Priority Data

Feb. 4, 2000 (JP) ........................................ 2000-027959
May 30, 2000 (JP) ........................................ 2000-160243

(51) Int. Cl.⁷ .................. C09K 19/30; C09K 19/34; C09K 19/12; C09K 19/20
(52) U.S. Cl. .............. 428/1.1; 252/299.61; 252/299.63; 252/299.66; 252/299.67
(58) Field of Search ................... 428/1.1; 252/299.01, 252/299.61, 299.63, 299.64, 299.66, 299.67

(56) References Cited

U.S. PATENT DOCUMENTS

| 5,354,503 | A | 10/1994 | Sawada et al. | ........ 252/299.63 |
| 5,520,846 | A | 5/1996 | Plach et al. | ............ 252/299.63 |
| 5,993,691 | A | 11/1999 | Pausch et al. | ......... 252/299.63 |
| 6,146,720 | A | 11/2000 | Pausch et al. | ................ 428/1.1 |

FOREIGN PATENT DOCUMENTS

| DE | 41 23 539 | 1/1993 |
| DE | 195 28 106 | 8/1996 |
| EP | 0 393 577 | 10/1990 |
| JP | 8-283719 | * 10/1996 |

OTHER PUBLICATIONS

English abstract of JP 8–283719, 1996.*

* cited by examiner

*Primary Examiner*—Shean C. Wu
(74) *Attorney, Agent, or Firm*—Wenderoth, Lind & Ponack, L.L.P.

(57) ABSTRACT

The present invention is to provide a liquid crystal composition which has particularly a high upper limit temperature of a nematic phase, a low lower limit temperature of the nematic phase and a small birefringence while satisfying general characteristics required for the liquid crystal composition for an AM-LCD. Liquid crystal compositions are disclosed which comprise a component I comprising at least one compound selected from the group of compounds represented by Formula (I-1) or (I-2) as described in the specification, a component II comprising at least one compound selected from the group of compounds represented by Formulas (II-1) to (II-8) as described in the specification and a component III comprising at least one compound selected from the group of compounds represented by Formulas (III-1) to (III-5) as described in the specification.

8 Claims, No Drawings

LIQUID CRYSTAL COMPOSITION AND LIQUID CRYSTAL DISPLAY DEVICE

FIELD OF INDUSTRIAL APPLICATION

The present invention relates to a nematic liquid crystal composition. More specifically, the present invention relates to a liquid crystal composition for an active matrix liquid crystal display (AM-LCD) and a liquid crystal display using this liquid crystal composition.

RELATED ART

At present, a transmissive AM-LCD using a back light has been put to practical use as a matrix liquid crystal display capable of displaying full color in various fields such as computer terminals, car navigation systems and the like. However, it has the defect that this back light consumes a large electricity, and brought about is the inconvenience that digital still cameras and digital video cameras which are loaded with the transmissive AM-LCD can not be used for long time.

In order to solve this problem, a reflective AM-LCD using no back light has been developed. As reported in SID97 Digest, p. 643 by S. -T. Wu, C. -S. Wu and C. -L. Kuo, light passes twice through a liquid crystal layer in the reflective AM-LCD, and therefore a product ($\Delta n \cdot d$) of a thickness (d) of the liquid crystal layer and a birefringence ($\Delta n$) of the liquid crystal has to be set to a lower level. To be specific, a $\Delta n$ required to a liquid crystal used for an AM-LCD of a conventional transmissive TN type has been roughly 0.075 to 0.120 but in the case of an AM-LCD of a reflective TN type, a $\Delta n$ required to a liquid crystal is 0.075 or less.

Characteristics other than a $\Delta n$ required to a liquid crystal composition for a reflective AM-LCD include the following items (1) to (4):

(1) In order to improve a contrast of the LCD, the composition has a high resistivity and a high voltage-holding ratio (VHR).
(2) In order to make it possible to use the LCD outdoors, the temperature range showing a nematic phase is wide (the upper limit temperature showing a nematic phase is high, and the lower limit temperature showing a nematic phase is low).
(3) In order to reduce an electricity consumed by the LCD, the threshold voltage (Vth) is low.
(4) In order to shorten the response time, the viscosity ($\eta$) is low.

Literatures disclosing liquid crystalline compounds or liquid crystal compositions which are considered to be usable for an AM-LCD include, for example, Japanese Patent Application Laid-Open No. 29771/1999, Japanese Patent Application Laid-Open No. 245559/1998, Japanese Patent Application Laid-Open No. 255956/1997 and Japanese Patent Application Laid-Open No. 249881/1997. However, these disclosed liquid crystal compositions have the defects that the $\Delta n$ is large or the $\Delta n$ is relatively small but the lower limit temperature showing a nematic phase is high and the voltage-holding ratio is low, and therefore it has been unsatisfactory for use in an AM-LCD of a reflective TN type.

As described above, the liquid crystal compositions for an AM-LCD have intensively been investigated according to various purposes, but the existing state is that they are always. requested to be newly improved.

PROBLEMS TO BE SOLVED BY THE INVENTION

An object of the present invention is to provide a liquid crystal composition which has particularly a high upper limit temperature of a nematic phase, a low lower limit temperature of the nematic phase and a small birefringence while satisfying general characteristics required to the liquid crystal composition for an AM-LCD described above.

MEANS FOR SOLVING THE PROBLEMS

Intensive investigations repeated by the present inventors in order to solve these problems have resulted in finding that the expected object can be achieved by a liquid crystal composition comprising a component I comprising at least one compound selected from the group of compounds represented by Formula (I-1) or (I-2), a component II comprising at least one compound selected from the group of compounds represented by Formulas (II-1) to (II-8) and a component III comprising at least one compound selected from the group of compounds represented by Formulas (III-1) to (III-5). Thus, they have come to complete the present invention.

The liquid crystal composition of the present invention is shown by the following items (1), (2) and (3):

(1) A liquid crystal composition comprising a component I comprising at least one compound selected from the group of compounds represented by Formula (I-1) or (I-2), a component II comprising at least one compound selected from the group of compounds represented by Formulas (II-1) to (II-8) and a component III comprising at least one compound selected from the group of compounds represented by Formulas (III-1) to (III-5):

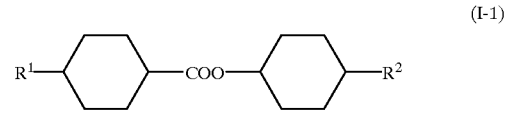

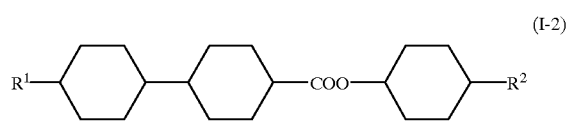

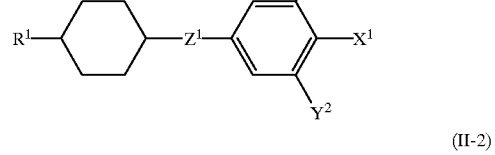

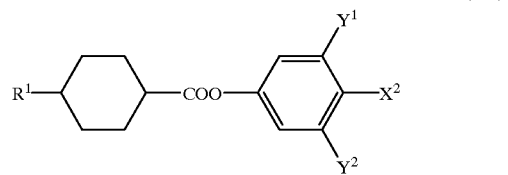

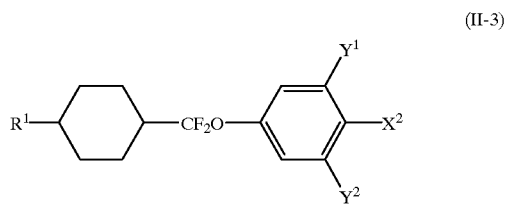

-continued

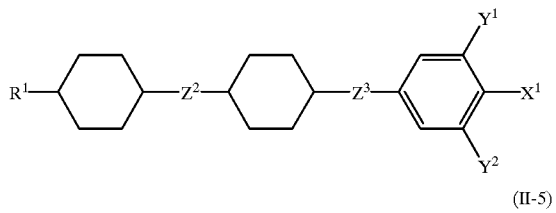
(II-4)

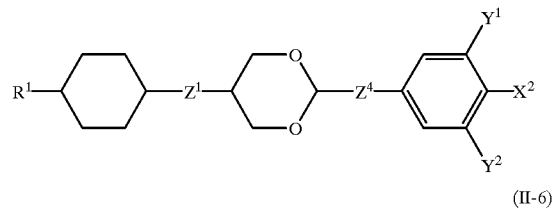
(II-5)

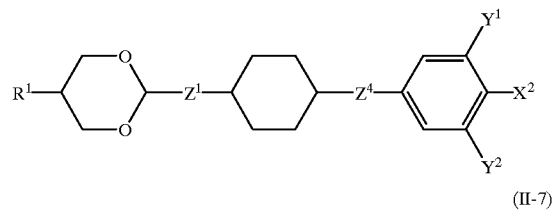
(II-6)

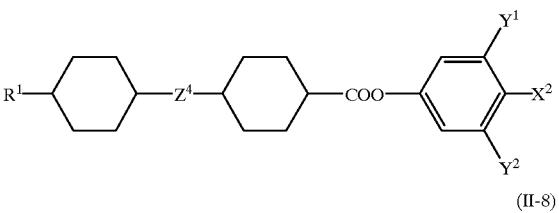
(II-7)

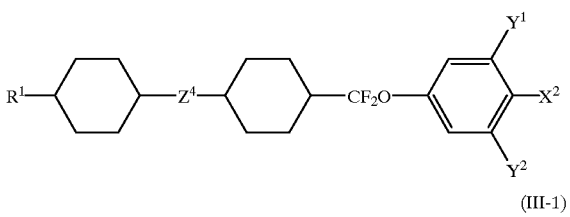
(II-8)

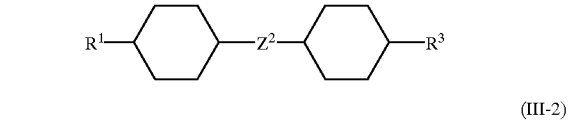
(III-1)

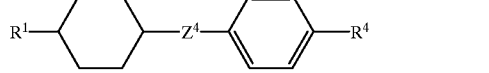
(III-2)

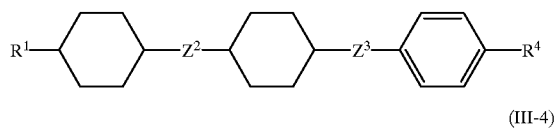
(III-3)

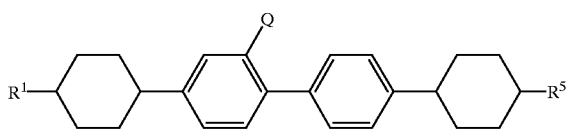
(III-4)

-continued

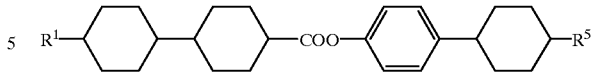
(III-5)

wherein $R^1$ and $R^2$ each represent independently an alkyl group, an alkoxy group, an alkoxymethyl group having 1 to 10 carbon atoms or an alkenyl group having 2 to 10 carbon atoms; $R^3$ represents an alkyl group, an alkoxy group, an alkoxymethyl group having 1 to 10 carbon atoms, an alkenyl group having 2 to 10 carbon atoms or —COO—$R^6$; $R^6$ represents an alkyl group having 1 to 10 carbon atoms; $R^4$ represents an alkyl group, an alkoxy group having 1 to 10 carbon atoms or an alkenyl group having 2 to 10 carbon atoms; $R^5$ represents an alkyl group, an alkoxy group, an alkoxymethyl group having 1 to 10 carbon atoms or an alkenyl group having 2 to 10 carbon atoms; $Z^1$ and $Z^4$ each represent independently a single bond or —CH$_2$CH$_2$—; $Z^2$ and $Z^3$ each represent independently a single bond, —CH$_2$CH$_2$— or —CH=CH—; $X^1$ represents F, Cl, OCHF$_2$ or OCF$_3$; $X^2$ represents F, OCHF$_2$ or OCF$_3$; $Y^1$ and $Y^2$ each represent independently H or F; and Q represents H or F.

(2) The liquid crystal composition as described in the above item (1), wherein the component I has a content of 3 to 30% by weight; the component II has a content of 5 to 80% by weight; and the component III has a content of 3 to 70% by weight each based on the whole weight of the liquid crystal composition.

(3) The liquid crystal composition as described in the above item (1) or (2), wherein a nematic phase has an upper limit temperature of 70° C. or higher, a lower limit temperature of −20° C. or lower and a birefringence of 0.075 or less.

The liquid crystal display of the present invention is shown by the following item (4):

(4) A liquid crystal display comprising the liquid crystal composition as described in any of the above items (1) to (3).

EMBODIMENT OF THE INVENTION

The component I in the liquid crystal composition of the present invention comprises at least one compound selected from the group of the compounds represented by Formula (I-1) or (I-2). The compound represented by Formula (I-1) has a birefringence (Δn) of almost 0, a clearing point (Tc) falling in a range of 10 to 30° C. and a dielectric anisotropy (Δ∈) of almost 0 and is excellent in a heat stability, a chemical stability and a compatibility. The compound represented by Formula (I-2) has a Δn falling in a range of about 0.06 to 0.07, a Tc falling in a range of 140 to 160° C. and a Δ∈ of almost 0 and is excellent in a heat stability, a chemical stability and a compatibility. This allows the component I to assume a role to reduce a Δn while maintaining particularly a high Tc in a liquid crystal composition for a TFT to which a high reliability is required. However, a composition prepared only from these compounds not only has a too narrow temperature range showing a nematic phase of the composition but also is increased too much in a threshold voltage and therefore is not preferred.

The component II in the liquid crystal composition of the present invention comprises at least one compound selected from the group of the compounds represented by Formulas (II-1) to (II-8). The compounds represented by Formulas (II-1) to (II-8) have a Tc falling in a range of roughly −50 to 160° C., a Δ∈ falling in a range of roughly 5 to 20 and a Δn falling in a range of roughly 0.03 to 0.12 and is excellent in a heat stability, a chemical stability and a compatibility. This allows the component II to assume a role to reduce particularly a threshold voltage in a liquid crystal composition for a TFT to which a high reliability is required. However, a composition prepared only from these compounds not only is deteriorated in a compatibility of the composition but also is increased in a Δn and a viscosity and therefore is not preferred.

The preferred compounds of the component II include the following compounds. $R^1$ in the formulas is synonymous with the definition described above.

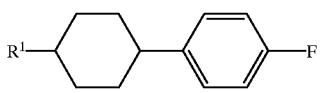
(II-1-1)

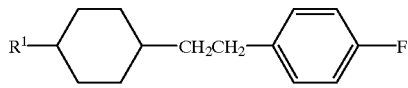
(II-1-2)

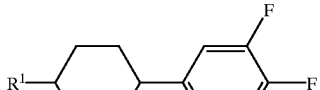
(II-1-3)

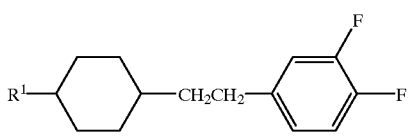
(II-1-4)

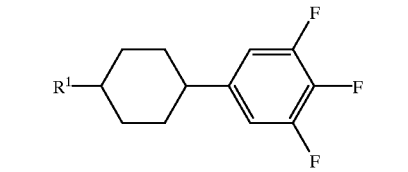
(II-1-5)

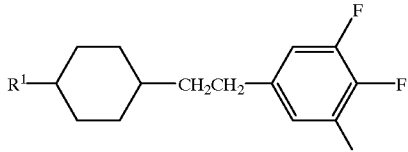
(II-1-6)

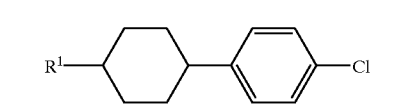
(II-1-7)

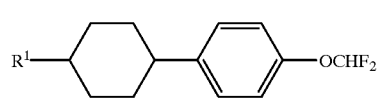
(II-1-8)

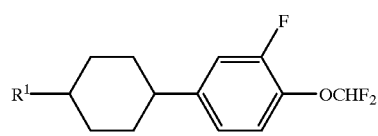
(II-1-9)

-continued

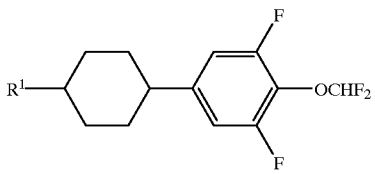
(II-1-10)

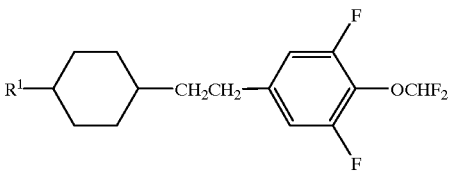
(II-1-11)

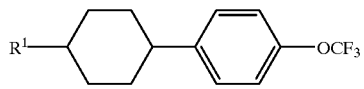
(II-1-12)

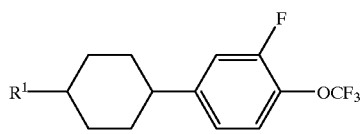
(II-1-13)

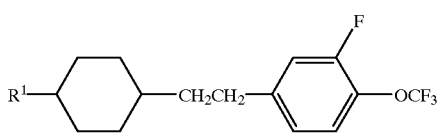
(II-1-14)

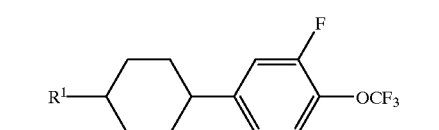
(II-1-15)

(II-1-16)

(II-2-1)

(II-2-2)

(II-2-3)

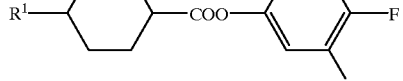

(II-2-4) 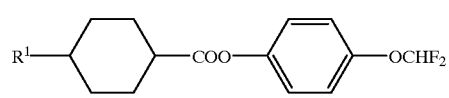
(II-2-5) 
(II-2-6) 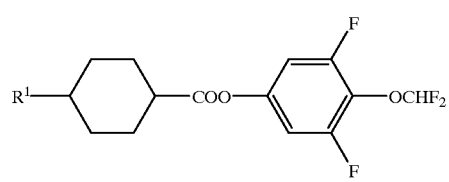
(II-2-7) 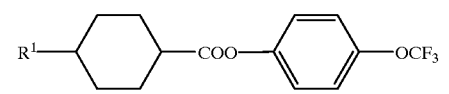
(II-2-8) 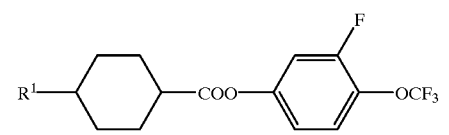
(II-2-9) 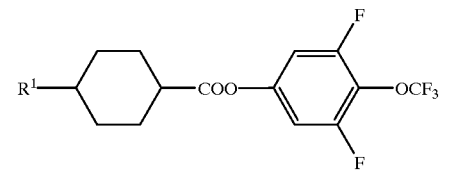
(II-3-1) 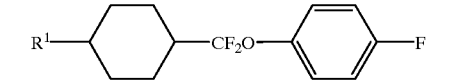
(II-3-2) 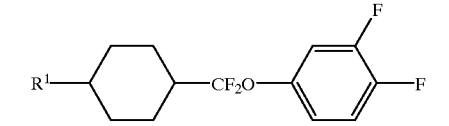
(II-3-3) 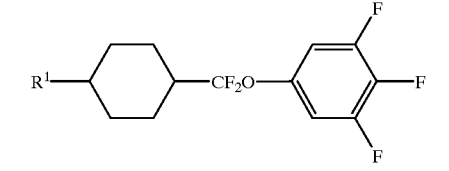
(II-3-4) 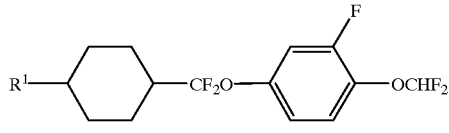
(II-3-5) 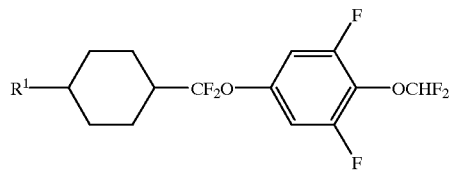
(II-3-6) 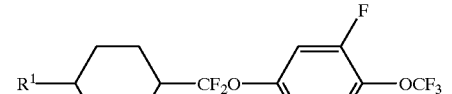
(II-3-7) 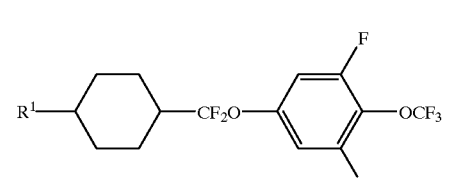
(II-4-1) 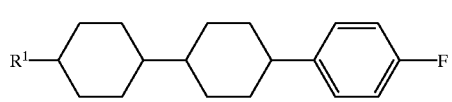
(II-4-2) 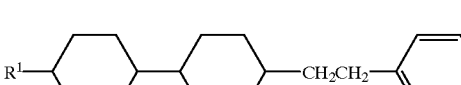
(II-4-3) 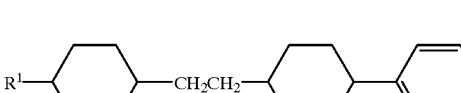
(II-4-4) 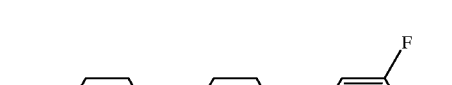
(II-4-5) 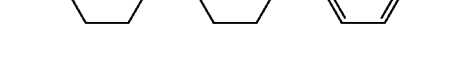
(II-4-6) 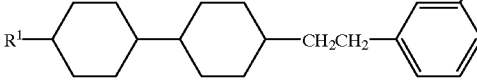
(II-4-7) 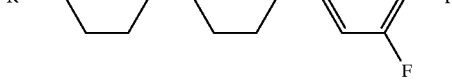

(II-4-8) 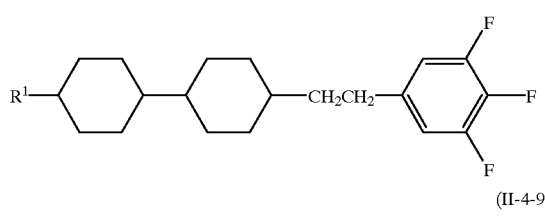
(II-4-9) 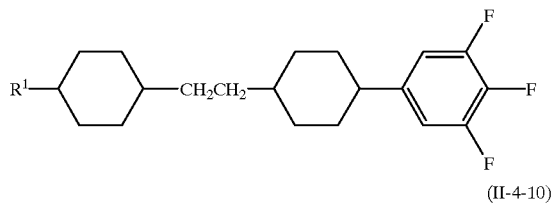
(II-4-10) 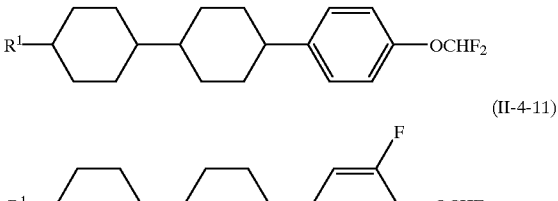
(II-4-11) 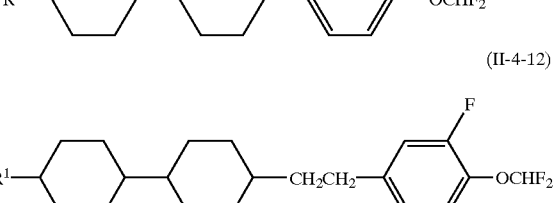
(II-4-12) 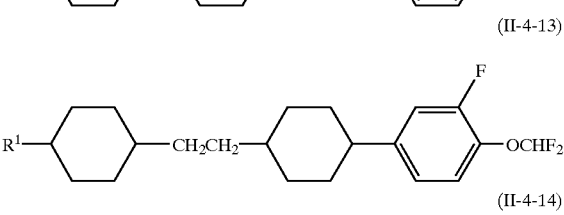
(II-4-13) 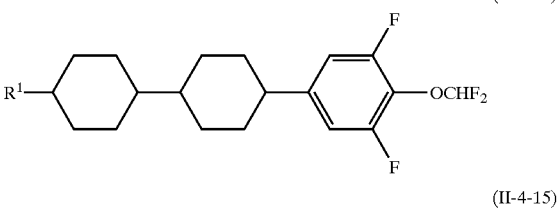
(II-4-14) 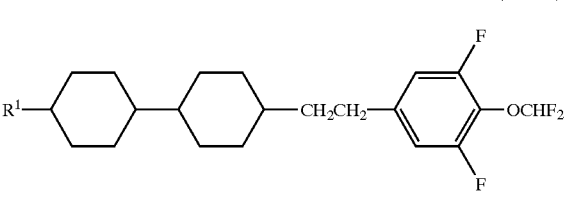
(II-4-15) 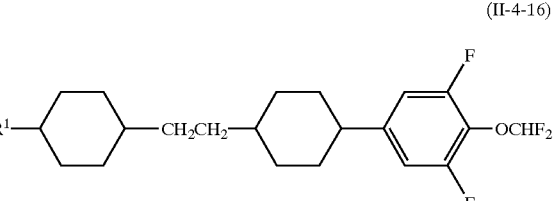
(II-4-16) 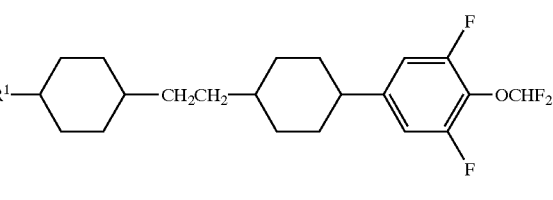
(II-4-17) 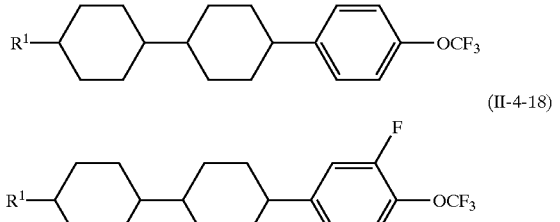
(II-4-18) 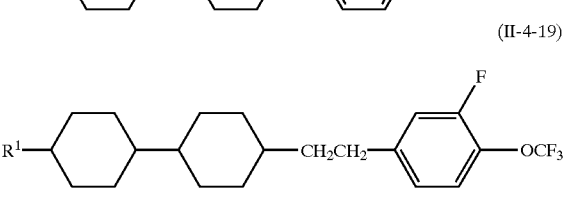
(II-4-19) 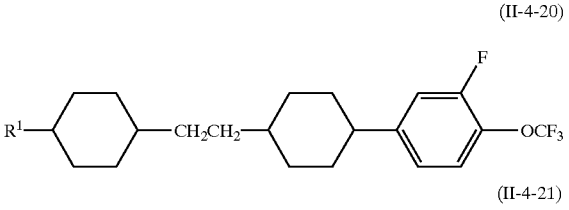
(II-4-20) 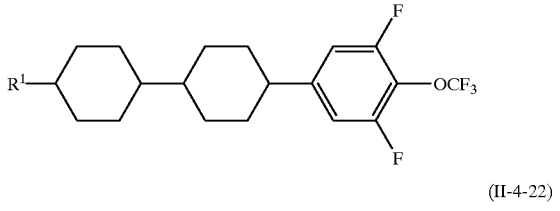
(II-4-21) 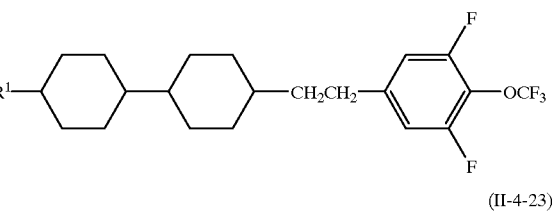
(II-4-22) 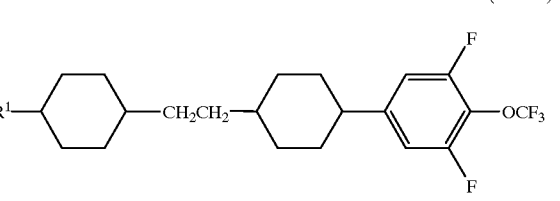
(II-4-23) 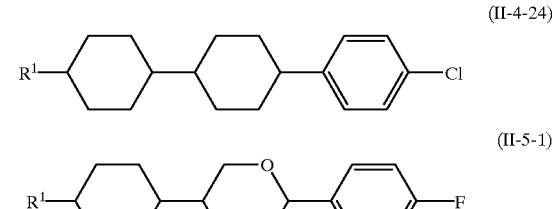
(II-4-24) 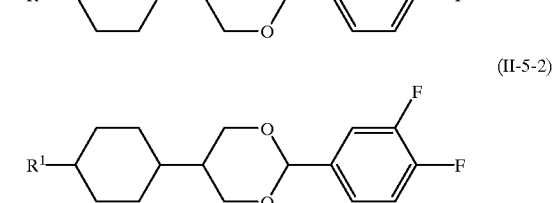
(II-5-1)
(II-5-2) 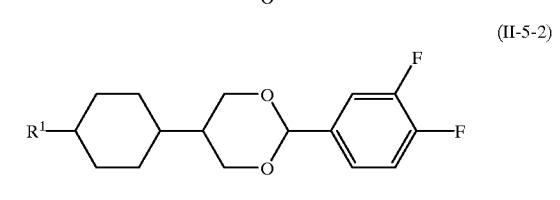

(II-5-3) 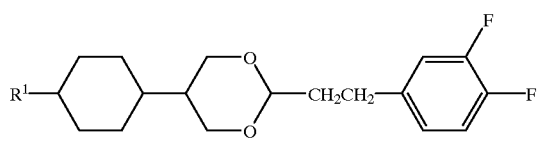
(II-5-4) 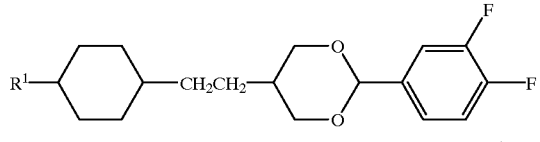
(II-5-5) 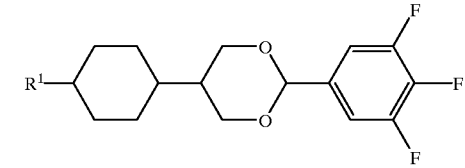
(II-5-6) 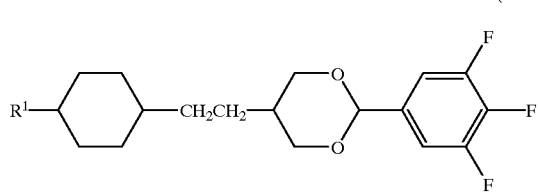
(II-6-1) 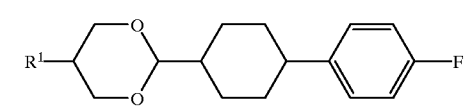
(II-6-2) 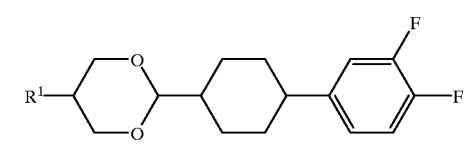
(II-6-3) 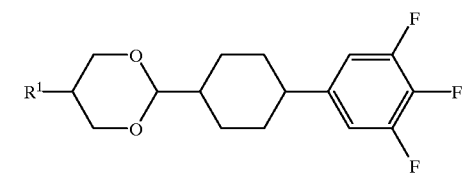
(II-6-4) 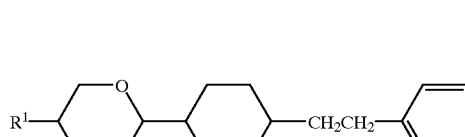
(II-6-5) 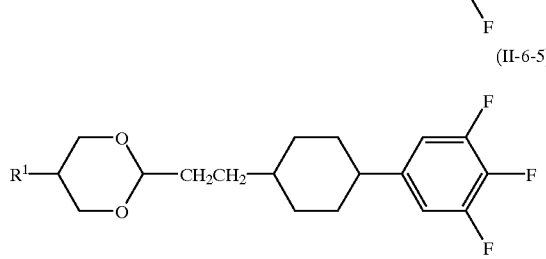
(II-7-1) 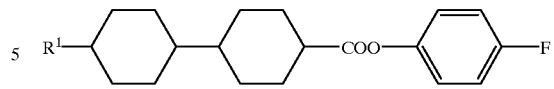
(II-7-2) 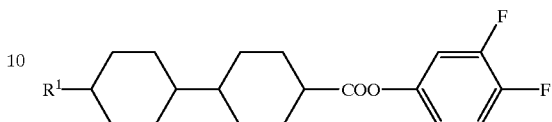
(II-7-3) 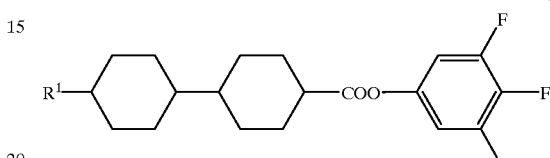
(II-7-4) 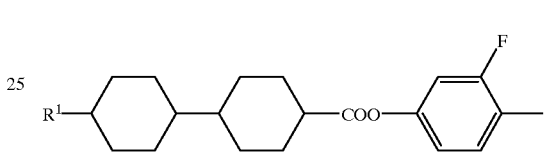
(II-7-5) 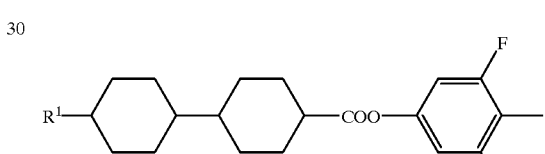
(II-7-6) 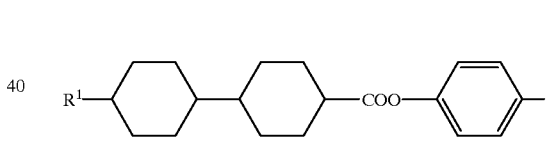
(II-7-7) 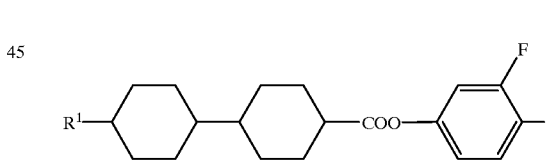
(II-7-8) 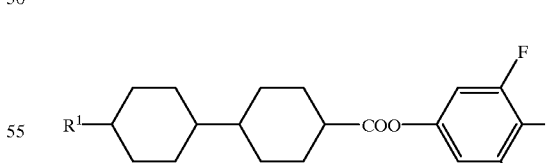
(II-8-1) 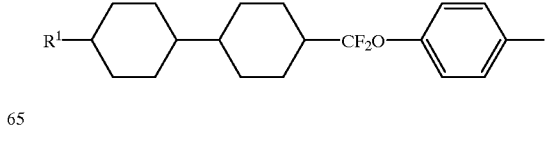

-continued

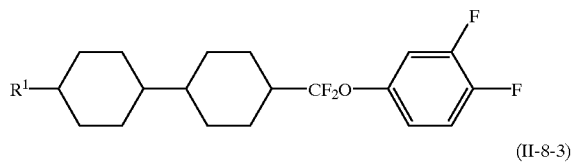
(II-8-2)

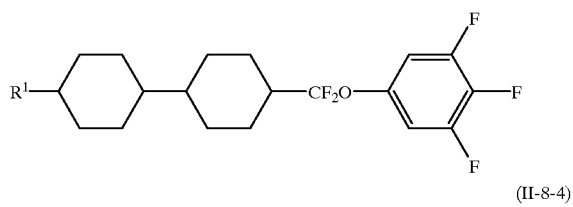
(II-8-3)

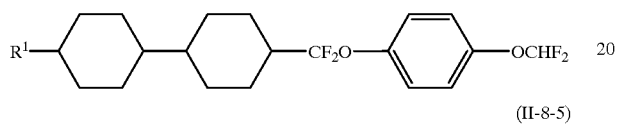
(II-8-4)

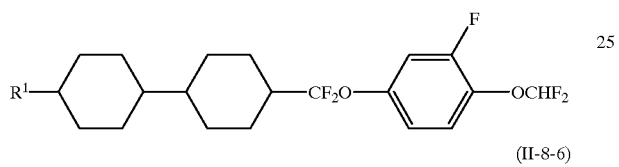
(II-8-5)

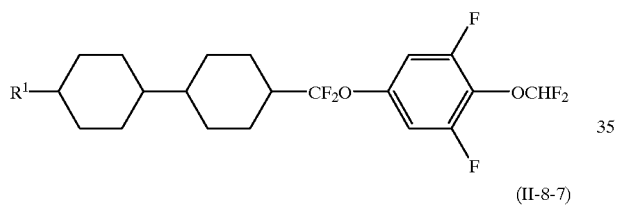
(II-8-6)

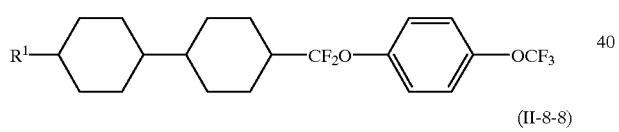
(II-8-7)

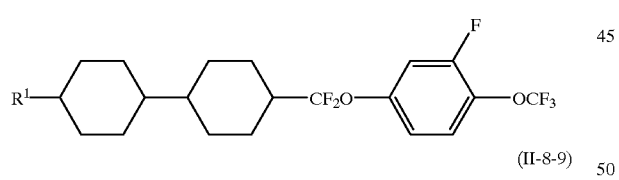
(II-8-8)

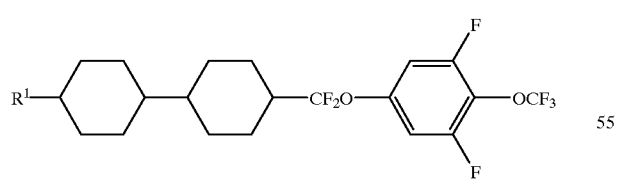
(II-8-9)

The component III in the liquid crystal composition of the present invention comprises at least one compound selected from the group of the compounds represented by Formulas (III-1) to (III-5). The compounds represented by Formulas (III-1) and (III-2) have a Tc falling in a range of roughly 0 to 60° C., a ΔE of almost 0 and a Δn falling in a range of roughly 0.03 to 0.07, and it has particularly a low viscosity and is excellent in a heat stability, a chemical stability and a compatibility. The compounds represented by Formulas (III-3) to (III-5) have a Tc falling in a range of roughly 140 to 260° C., a ΔE of almost 0 and a Δn falling in a range of roughly 0.12 to 0.16 and is excellent in a heat stability, a chemical stability and a compatibility. This allows the component III to assume a role not only to elevate a Tc of the composition but also reduce a viscosity thereof. However, a composition prepared only from these compounds is increased too much in a threshold voltage in a certain case and therefore is not preferred.

The preferred compounds of the component III include the following compounds. $R^1$ and $R^3$ to $R^6$ in the formulas are synonymous with the definitions described above.

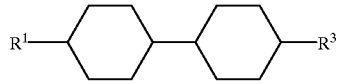
(III-1-1)

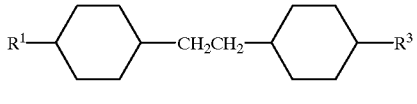
(III-1-2)

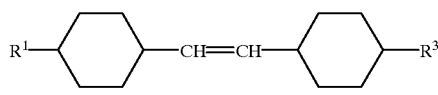
(III-1-3)

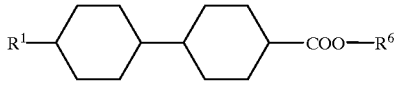
(III-1-4)

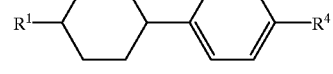
(III-2-1)

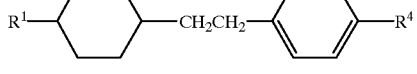
(III-2-2)

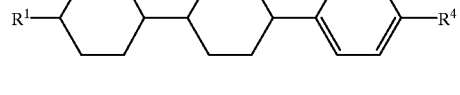
(III-3-1)

(III-3-2)

(III-4-1)

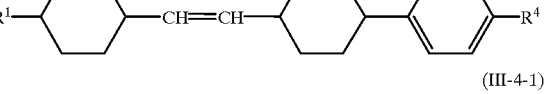
(III-4-2)

(III-5-1)

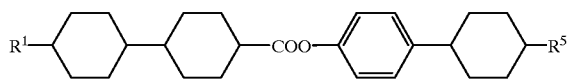

In the present invention, the liquid crystal composition for an AM-LCD having a small Δn, a small viscosity and a broad nematic phase range can be prepared by optionally combining the component I, the component II and the component III. That is, capable of being obtained is the liquid crystal composition which has a Tc falling in a range of roughly 70 to 100° C., a Δn falling in a range of roughly 0.05 to 0.75 and a threshold voltage falling in a range of roughly 1.0 to 2.5 V and which has a low viscosity, a broad nematic phase range and a high voltage-holding ratio.

The contents of the respective components in the liquid crystal composition of the present invention shall be explained. The component I has preferably a content of 3 to 30% by weight, more preferably 5 to 28% by weight based on the whole weight of the liquid crystal composition. If it is less than 3% by weight, the liquid crystal composition is increased in a Δn in a certain case, and therefore it is not preferred. On the other hand, if it exceeds 30% by weight, the liquid crystal composition is degraded in a compatibility at a low temperature in a certain case, and therefore it is not preferred as well.

The component II has preferably a content of 5 to 80% by weight, more preferably 10 to 80% by weight based on the whole weight of the liquid crystal composition. If it is less than 5% by weight, the liquid crystal composition is increased too much in a threshold voltage, and therefore it is not preferred. On the other hand, if it exceeds 80% by weight, the liquid crystal composition is increased in a Δn as well as a viscosity in a certain case, and therefore it is not preferred as well.

The component III has preferably a content of 3 to 70% by weight, more preferably 5 to 70% by weight based on the whole weight of the liquid crystal composition. If it is less than 3% by weight, the liquid crystal composition is degraded in a compatibility at a low temperature in a certain case, and therefore it is not preferred. On the other hand, if it exceeds 70% by weight, the liquid crystal composition is increased in a threshold voltage in a certain case, and therefore it is not preferred as well.

Next, the characteristic values of the liquid crystal composition constituting the present invention shall be explained in detail.

A display using a liquid crystal composition in which an upper limit temperature of a nematic phase is lower than 70° C. and a lower limit temperature of a nematic phase is higher than −20° C. is limited in an environmental temperature. In particular, if it is used outdoors, there is the possibility that it can not be displayed and the function as a display can not be carried out. Accordingly, the nematic phase range of the liquid crystal composition is preferably set to 70° C. or higher for an upper limit temperature showing a nematic phase and −20° C. or lower for a lower limit temperature.

When using the liquid crystal composition in which a Δn determined on the conditions of 25° C. and λ=589 nm is larger than 0.075, a white display in a reflective AM-LCD is tinged with yellow in a certain case. Accordingly, the liquid crystal composition has preferably a birefringence of 0.075 or less.

The compounds constituting the components of the liquid crystal composition of the present invention can be synthesized by methods described in the following official gazettes. The synthetic methods of the compounds represented by Formula (I-2) are described respectively in Japanese Patent Application Laid-Open No. 106454/1979. The synthetic methods of the compounds of (II-2-3), (II-4-7), (II-5-5), (II-6-3) and (II-7-3) each corresponding to the examples of the compounds represented by Formulas (II-2), (II-4), (II-5), (II-6) and (II-7) are described in Japanese Patent Application Laid-Open No. 233626/1990. Further, the synthetic method of the compound of (II-7-1) as one example of the compound represented by Formula (II-7) is described in Japanese Patent Application Laid-Open No. 135445/1981. The synthetic method of the compound of (II-8-3) as one example of the compound represented by Formula (II-8) is described in Japanese Patent Application Laid-Open No. 204016/1998.

The synthetic method of the compound of (III-1-1) as one example of the compound represented by Formula (III-1) is described in Japanese Patent Application Laid-Open No. 70624/1984 or Japanese Patent Application Laid-Open No. 16940/1985. The synthetic method of the compound of (III-3-1) as one example of the compound represented by Formula (III-3) is described in Japanese Patent Application Laid-Open No. 165328/1982. The synthetic method of the compound of (III-4-1) as one example of the compound represented by Formula (III-4) is described in Japanese Patent Publication No. 46527/1987. As described above, the respective compounds of the components constituting the liquid crystal composition of the present invention can be synthesized by related arts.

The liquid crystal composition of the present invention can be prepared by conventional processes which are generally used, for example, a process in which various compounds are mixed and dissolved each other at a high temperature. For the purpose to induce a helical structure of the liquid crystal molecules to control the required twist angle, a chiral dopant such as cholesteryl nonanoate may be added to the liquid crystal composition of the present invention. Also, the liquid crystal composition of the present invention can be used as a liquid crystal composition of a guest-host mode by adding dichronic dyes of a merocyanine base, a styryl base, an azo base, an azomethine base, an azoxy base, a quinophthalone base, an anthraquinone base and a tetrazine base. Further, it can be used as a polymer dispersion type liquid crystal display and liquid crystal compositions of a birefringence-controlling mode and a dynamic scattering mode. Or, it can also be used as a liquid crystal composition of an in•plane•swtching mode.

EXAMPLES

The present invention shall be explained below in detail with reference to examples, but the present invention shall not be restricted to these examples. In the comparative examples and the examples, all percentages showing the composition ratios were represented by weight %, and the compounds were represented by codes based on definitions shown in Table 1. In the characteristic data of the liquid crystal composition, represented were the upper limit temperature showing a nematic phase, that is, the clearing point by $T_C$, the lower limit temperature showing a nematic phase by $T_L$, the birefringence at 25° C. by Δn, the dielectric anisotropy at 25° C. by Δ∈, the viscosity at 20° C. by $\eta_{20}$, and the voltage-holding ratios at 25° C. and 80° C. by VHR (25° C.) and VHR (80° C.), respectively. The $T_L$ was judged by the liquid crystal phase observed after leaving it standing in the respective freezers of 0° C., −10° C., −20° C., −30° C. and −40° C. for 30 days. For example, when one liquid crystal composition took a nematic state at −20° C. and was crystallized at −30° C., the $T_L$ of the liquid crystal composition was expressed by <−20° C. The Δn was measured at 25° C. using a light source lamp having a wavelength of 589 nm. The Vth was represented by a value of voltage applied when the transmission factor of light passing through the cell became 90%, wherein the cell having a cell thickness of (0.4/Δn) μm and a twist angle of 80° was used, and a square wave having a frequency of 32 Hz was applied in a normally white mode. The voltage-holding ratio (VHR) was determined by an area method, wherein a TN cell (PIA-5210 manufactured by Chisso Corporation was used for an alignment film) was prepared, and a holding time was set to 16.6 msec.

TABLE 1

R—(A$_1$)—Z$_1$————Z$_n$—(A$_n$)—X

| 1) Left terminal group R— | Symbol |
|---|---|
| C$_n$H$_{2n+1}$— | n- |
| C$_n$H$_{2n+1}$OC$_m$H$_{2m}$— | nOm— |
| CH$_2$=CH— | V— |
| CH$_2$=CHC$_n$H$_{2n}$— | Vn- |
| C$_n$H$_{2n+1}$CH=CHC$_m$H$_{2m}$— | nVm- |

| 2) Ring structure —(A$_1$)—, —(A$_n$)— | Symbol |
|---|---|
|  | H |
| 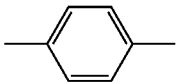 | B |
| 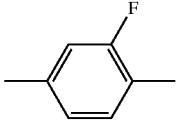 | B(F) |
| 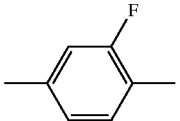 | B(F, F) |
| 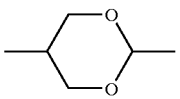 | D |

| 3) Bonding group —Z—, —Z$_n$— | Symbol |
|---|---|
| —C$_2$H$_4$— | 2 |
| —COO— | E |
| —CF$_2$O— | CF2O |
| —CH=CH— | V |

| 4) Right terminal group —X | Symbol |
|---|---|
| —CN | —CN |
| —F | —F |
| —Cl | —CL |
| —OCHF$_2$ | —OCHF2 |

TABLE 1-continued

R—(A$_1$)—Z$_1$————Z$_n$—(A$_n$)—X

| —OCF$_3$ | —OCF3 |
|---|---|
| —C$_n$H$_{2n+1}$ | -n |
| —OC$_n$H$_{2n+1}$ | —On |
| —COOCH$_3$ | -EMe |
| —C$_n$H$_{2n}$OC$_m$H$_{2m+1}$ | -nOm |
| —CH=CH$_2$ | —V |
| —C$_n$H$_{2n}$CH=CH$_2$ | -nV |

5) Example of expression

Example 1; V-HEH-3

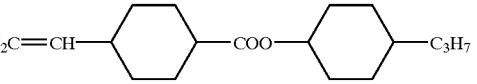

Example 2; 3-HHCF2OB(F)—OCF3

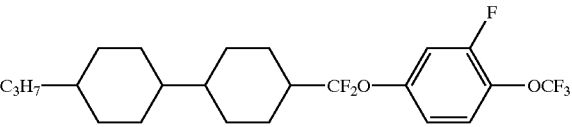

Among Japanese Patent Application Laid-Open No. 29771/1999, Japanese Patent Application Laid-Open No. 245559/1998, Japanese Patent Application Laid-Open No. 255956/1997 and Japanese Patent Application Laid-Open No. 249881/1997 each disclosing liquid crystal compositions for an AM-LCD having a relatively small Δn as described above, the liquid crystal compositions disclosed in Example 20 and Example 10 of Japanese Patent Application Laid-Open No. 29771/1999 and Example 1 of Japanese Patent Application Laid-Open No. 255956/1997 were used as comparative examples.

Comparative Example 1

Prepared was a liquid crystal composition described in Example 20 having the smallest Δn among the liquid crystal compositions described in Japanese Patent Application Laid-Open No. 29771/1999, and the physical property values were measured. Prepared was the liquid crystal composition comprising:

| 2-HHB (F, F)—F | 8.0% |
|---|---|
| 3-HHB (F, F)—F | 10.0% |
| 5-HHB (F, F)—F | 5.0% |
| 2-HHB—OCF3 | 9.0% |
| 3-HHB—OCF3 | 8.0% |
| 4-HHB—OCF3 | 3.0% |
| 5-HHB—OCF3 | 3.0% |
| 2-HB (F, F)—CN | 3.0% |
| 3-HB (F, F)—CN | 3.0% |
| 5-HB (F, F)—CN | 8.0% |
| 2-HHEB (F, F)—F | 5.0% |
| 3-HHEB (F, F)—F | 12.0% |
| 5-HHEB (F, F)—F | 5.0% |
| 5-HH—V | 18.0% |

This composition had characteristics shown below:
 $T_C$=75.5° C.
 $T_L$<−20° C.
 Δn=0.074
 VHR(25° C.)=93.7%
 VHR(80° C.)=68.2%

This liquid crystal composition has a relatively small Δn but has a low voltage-holding ratio particularly at a high temperature (80° C.) since a CN compound is contained.

Comparative Example 2

Prepared was a liquid crystal composition described in Example 10 having a small Δn and containing no CN compound among the liquid crystal compositions described in Japanese Patent Application Laid-Open No. 29771/1999, and the physical property values were measured. Prepared was the liquid crystal composition comprising:

| | |
|---|---|
| 2-HHB—OCF3 | 5.0% |
| 3-HHB—OCF3 | 7.0% |
| 4-HHB—OCF3 | 4.0% |
| 5-HHB—OCF3 | 5.0% |
| 2-HHB (F, F)—F | 10.0% |
| 3-HHB (F, F)—F | 9.0% |
| 5-HHB (F, F)—F | 7.0% |
| 2-HB (F) B (F, F)—F | 4.0% |
| 3-HB (F) B (F, F)—F | 4.0% |
| 5-HB (F) B (F, F)—F | 4.0% |
| 2-HHEB (F, F)—F | 5.0% |
| 3-HHEB (F, F)—F | 12.0% |
| 5-HHEB (F, F)—F | 5.0% |
| 7-HB—F | 8.0% |
| 3-HH—4 | 6.0% |
| 5-HH—V | 5.0% |

This composition had characteristics shown below:

$T_C$=77.2° C.
$T_L$<-10° C.
Δn=0.076
$\eta_{20}$=22.6 mPa·s
Vth=1.47V
VHR(25° C.)=98.6%
VHR(80° C.)=98.1%

This liquid crystal composition has a high $T_L$ point but has a large Δn as compared with that of the composition of the present invention having the same $T_C$ and Vth since a tricyclic compound having a biphenyl skeleton is contained in the composition.

Comparative Example 3

Prepared was a liquid crystal composition described in Example 1 having a small Δn and containing no CN compound among the liquid crystal compositions described in Japanese Patent Application Laid-Open No. 255956/1997, and the physical property values were measured. Prepared was the liquid crystal composition comprising:

| | |
|---|---|
| 7-HB—F | 12.8% |
| 2-HHB (F, F)—OCHF2 | 14.9% |
| 3-HHB (F, F)—OCHF2 | 13.8% |
| 5-HHB (F, F)—OCHF2 | 15.9% |
| 2-HHB (F)—OCF3 | 17.0% |
| 3-HHB (F)—OCF3 | 12.8% |
| 5-HHB (F)—OCF3 | 12.8% |

This composition had characteristics shown below:

$T_C$=85.2° C.
$T_L$<-10° C.
Δn=0.080
Vth=1.29V

This liquid crystal composition has a high $T_L$ point and a large Δn.

Example 1

Prepared was a liquid crystal composition comprising:

| | |
|---|---|
| Component I | |
| 2-HEH-3 | 6.0% |
| 3-HEH-3 | 6.0% |
| 4-HEH-3 | 6.0% |
| 3-HEH-5 | 6.0% |
| Component II | |
| 3-HHB (F)—F | 8.0% |
| 4-HHB (F)—F | 8.0% |
| 3-DHB (F, F)—F | 8.0% |
| 3-HDB (F, F)—F | 6.0% |
| 5-HDB (F, F)—F | 6.0% |
| 3-HHEB—F | 6.0% |
| 5-HHEB—F | 6.0% |
| 3-HHEB (F, F)—F | 10.0% |
| 4-HHEB (F, F)—F | 5.0% |
| 3-HHCF2OB (F, F)—F | 5.0% |
| Component III | |
| 3-HH-4 | 4.0% |
| 3-HB—O2 | 4.0% |

This composition had characteristics shown below:

$T_C$=83.0° C.
$T_L$<-20° C.
Δn=0.059
$\eta_{20}$=21.7 mPa·s
Vth=1.50V
VHR(25° C.)=98.7%
VHR(80° C.)=98.1%

This liquid crystal composition has a high VHR, a high $T_C$ point, a low $T_L$ point and a small Δn.

Example 2

Prepared was a liquid crystal composition comprising:

| | |
|---|---|
| Component I | |
| 3-HHEH-3 | 3.0% |
| 4-HHEH-3 | 3.0% |
| Component II | |
| 7-HB—F | 5.0% |
| 7-HB (F, F)—F | 6.0% |
| 3-HHB (F)—F | 12.0% |
| 4-HHB (F)—F | 12.0% |
| 3-HHB (F, F)—F | 5.0% |
| 5-HHB (F, F)—F | 5.0% |
| 3-HH2B (F, F)—F | 5.0% |
| 3-HHB—OCF3 | 10.0% |
| Component III | |
| 3-HH—O1 | 8.0% |
| 5-HH—O1 | 8.0% |
| 3-HH—EMe | 8.0% |
| 3-HB—O2 | 10.0% |

This composition had characteristics shown below:

$T_C$=72.9° C.
$T_L$<-20° C.
Δn=0.061
$\eta_{20}$=16.7 mPa·s

Vth=1.78V
VHR(25° C.)=99.0%
VHR(80° C.)=98.6%

This liquid crystal composition has a high VHR, a high $T_C$ point, a low $T_L$ point and a small $\Delta n$.

Example 3

Prepared was a liquid crystal composition comprising:

| Component I | |
|---|---|
| 3-HEH-3 | 3.0% |
| 3-HHEH-3 | 3.0% |
| Component II | |
| 7-HB (F)—F | 5.0% |
| 7-HB (F, F)—F | 5.0% |
| 5-HB—CL | 5.0% |
| 3-HHB—F | 5.0% |
| 3-HHB (F, F)—F | 5.0% |
| 5-HHB (F, F)—F | 5.0% |
| 3-H2HB (F, F)—F | 5.0% |
| 3-HHB (F)—OCF3 | 5.0% |
| 3-HHB (F, F)—OCF3 | 10.0% |
| 3-HHCF2OB (F, F)—F | 12.0% |
| 5-HHCF2OB (F, F)—F | 12.0% |
| Component III | |
| 3-HH-4 | 4.0% |
| 3-HB—O2 | 5.0% |
| 3-HHB-1 | 4.0% |
| 3-HHB—O1 | 4.0% |
| 4-HBBH-4 | 3.0% |

This composition had characteristics shown below:

$T_C$=86.7° C.
$T_L$<−20° C.
$\Delta n$=0.071
$\eta_{20}$=21.4 mPa·s
Vth=1.46V
VHR(25° C.)=99.1%
VHR(80° C.)=98.5%

This liquid crystal composition has a high VHR, a high $T_C$ point, a low $T_L$ point and a small $\Delta n$.

Example 4

Prepared was a liquid crystal composition comprising:

| Component I | |
|---|---|
| 3-HHEH-3 | 2.0% |
| 4-HHEH-3 | 2.0% |
| 3-HHEH-5 | 3.0% |
| 4-HHEH-5 | 2.0% |
| Component II | |
| 7-HB—F | 8.0% |
| 3-HHB (F, F)—F | 6.0% |
| 5-HHB (F, F)—F | 6.0% |
| 3-HHB (F, F)—OCHF2 | 7.0% |
| 3-HHEB (F, F)—F | 7.0% |
| 4-HHEB (F, F)—F | 7.0% |
| Component III | |
| 3-HH—O1 | 18.0% |
| 5-HH—O1 | 5.0% |
| 3-HH-2V | 22.0% |
| 3-HHEBH-3 | 2.0% |
| 5-HHEBH-3 | 3.0% |

This composition had characteristics shown below:

$T_C$=86.1° C.
$T_L$<−20° C.
$\Delta n$=0.060
$\eta_{20}$=18.2 mPa·s
Vth=2.18V
VHR(25° C.)=99.3%
VHR(80° C.)=98.7%

Example 5

Prepared was a liquid crystal composition comprising:

| Component I | |
|---|---|
| 2-HHEH-3 | 3.0% |
| 3-HHEH-3 | 3.0% |
| 4-HHEH-3 | 3.0% |
| 4-HHEH-5 | 3.0% |
| Component II | |
| 7-HB—F | 5.0% |
| 7-HB (F)—F | 3.0% |
| 5-H2B (F) F | 3.0% |
| 3-HHB (F, F)—F | 6.0% |
| 5-HHB (F, F)—F | 5.0% |
| V—HHB (F, F)—F | 4.0% |
| 3-HHB—OCF3 | 7.0% |
| 5-HHB—OCF3 | 7.0% |
| 3-HHB (F)—OCF3 | 8.0% |
| 5-HHB (F)—OCF3 | 8.0% |
| Component III | |
| 3-HH-4 | 10.0% |
| 3-HH—O1 | 8.0% |
| 5-HH—O1 | 3.0% |
| 1V2-HH-3 | 5.0% |
| 3-HB—O2 | 6.0% |

This composition had characteristics shown below:

$T_C$=81.2° C.
$T_L$<−20° C.
$\Delta n$=0.063
$\eta_{20}$=16.2 mPa·s
Vth=1.79V
VHR(25° C.)=99.0%
VHR(80° C.)=98.6%

Example 6

Prepared was a liquid crystal composition comprising:

| Component I | |
|---|---|
| 3-HEH-3 | 3.0% |
| 4-HEH-3 | 3.0% |
| 3-HHEH-3 | 3.0% |
| 4-HHEH-3 | 3.0% |
| Component II | |
| 5-HB—CL | 5.0% |

-continued

| | |
|---|---|
| 3-HEB—F | 3.0% |
| 5-HEB (F, F)—F | 3.0% |
| 3-HEB—OCF3 | 4.0% |
| 3-HHB (F)—OCF3 | 6.0% |
| 3-DHB (F, F)—F | 5.0% |
| 3-HDB (F, F)—F | 10.0% |
| 5-HDB (F, F)—F | 9.0% |
| 3-H2DB (F, F)—F | 5.0% |
| 3-HHEB—F | 6.0% |
| 5-HHEB—F | 5.0% |
| 3-HHEB (F, F)—F | 10.0% |
| 4-HHEB (F, F)—F | 5.0% |
| Component III | |
| 3-HH-4 | 8.0% |
| 3-HB—O2 | 4.0% |

This composition had characteristics shown below:

$T_C = 83.7°$ C.

$T_L < -20°$ C.

$\Delta n = 0.065$ $\eta_{20} = 23.2$ mPa·s

Vth=1.42V

VHR(25° C.)=98.8%

VHR(80° C.)=98.3%

Example 7

Prepared was a liquid crystal composition comprising:

| | |
|---|---|
| Component I | |
| 3-HEH-3 | 6.0% |
| 4-HEH-3 | 6.0% |
| Component II | |
| 7-HB (F)—F | 5.0% |
| 5-H2B (F)—F | 5.0% |
| 3-HHB (F)—F | 8.0% |
| 4-HHB (F)—F | 8.0% |
| 3-HHB (F)—OCHF2 | 5.0% |
| 3-HHB (F, F)—OCHF2 | 5.0% |
| 3-HHB—OCF3 | 5.0% |
| 3-HHB (F)—OCF3 | 5.0% |
| 5-HHB (F)—OCF3 | 5.0% |
| 3-HHB (F, F)—OCF3 | 5.0% |
| 3-HHEB—F | 4.0% |
| 5-HHEB—F | 4.0% |
| 3-HHCF2OB (F, F)—F | 5.0% |
| 5-HHCF2OB (F, F)—F | 5.0% |
| Component III | |
| 3-HH-4 | 4.0% |
| 1V2-HH-3 | 5.0% |
| V—HH-4 | 5.0% |

This composition had characteristics shown below:

$T_C = 84.3°$ C.

$T_L < -20°$ C.

$\Delta n = 0.065$ $\eta_{20} = 17.9$ mPa·s

Vth=1.62V

VHR(25° C.)=99.0%

VHR(80° C.)=98.5%

Example 8

Prepared was a liquid crystal composition comprising:

| | |
|---|---|
| Component I | |
| 3-HEH-3 | 8.0% |
| 4-HEH-3 | 8.0% |
| 3-HHEH-3 | 4.0% |
| 4-HHEH-3 | 4.0% |
| 5-HHEH-3 | 4.0% |
| Component II | |
| 3-DHB (F, F)—F | 5.0% |
| 4-HHEB (F, F)—F | 4.0% |
| 3-HHCF2OB (F, F)—F | 3.0% |
| Component III | |
| 3-HH-4 | 5.0% |
| 3-HH—O1 | 7.0% |
| 5-HH—O1 | 10.0% |
| 1V2-HH-3 | 10.0% |
| 2-HH—EMe | 8.0% |
| 3-HH—EMe | 5.0% |
| 3-HB—O2 | 5.0% |
| 3-HHB-1 | 4.0% |
| 3-HHB—O1 | 3.0% |
| 4-HBBH-4 | 3.0% |

This composition had characteristics shown below:

$T_C = 82.4°$ C.

$T_L < -20°$ C.

$\Delta n = 0.053$ $\eta_{20} = 14.6$ mPa·s

Vth=2.47V

VHR(25° C.)=99.0%

VHR(80° C.)=98.8%

Example 9

Prepared was a liquid crystal composition comprising:

| | |
|---|---|
| Component I | |
| 3-HEH-3 | 8.0% |
| 4-HEH-3 | 8.0% |
| 2-HHEH-3 | 3.0% |
| 3-HHEH-3 | 3.0% |
| 4-HHEH-3 | 3.0% |
| 5-HHEH-3 | 3.0% |
| Component II | |
| 7-HB (F)—F | 4.0% |
| 5-HB—CL | 5.0% |
| 3-HEB—F | 5.0% |
| 5-HEB (F, F)—F | 5.0% |
| 3-HHB—F | 5.0% |
| 3-H2HB (F)—F | 4.0% |
| 3-HHB (F, F)—F | 4.0% |
| 5-HHB (F, F)—F | 4.0% |
| 3-HH2B (F, F)—F | 5.0% |
| 3-HHB—OCF3 | 3.0% |
| 3O1-HHB—OCF3 | 3.0% |
| 5-HHCF2OB—OCF3 | 5.0% |
| 3-HHCF2OB (F)—OCF3 | 5.0% |
| Component III | |
| 1V2-HH-3 | 5.0% |
| V2-HH-4 | 5.0% |
| 3-HHEBH-3 | 5.0% |

This composition had characteristics shown below:

$T_C$=87.0° C.

$T_L$<-20° C.

Δn=0.057

$\eta_{20}$=17.5 mPa·s

Vth=1.91V

VHR(25° C.)=99.0%

VHR(80° C.)=98.5%

Example 10

Prepared was a liquid crystal composition comprising:

| Component I | |
|---|---|
| 3-HEH-3 | 7.0% |
| 4-HEH-3 | 7.0% |
| 2-HHBH-3 | 3.0% |
| 3-HHEH-3 | 4.0% |
| 4-HHEH-3 | 3.0% |
| Component II | |
| 7-HB (F, F)—F | 9.0% |
| 3-HEB—F | 3.0% |
| 5-HEB (F, F)—F | 3.0% |
| 3-HHB—F | 4.0% |
| 3-HHB (F)—F | 4.0% |
| 3-H2HB (F)—F | 4.0% |
| 3-HHB (F, F)—F | 4.0% |
| 3-HHEB—F | 5.0% |
| 5-HHEB—F | 5.0% |
| 3-HHEB (F, F)—F | 10.0% |
| 4-HHEB (F, F)—F | 3.0% |
| Component III | |
| 3-HH-4 | 3.0% |
| 3-HB—O2 | 5.0% |
| 3-HB—O4 | 4.0% |
| 4-HBBH-4 | 5.0% |
| 3-HHEBH-3 | 5.0% |

This composition had characteristics shown below:

$T_C$=94.1° C.

$T_L$<-20° C.

Δn=0.059

$\eta_{20}$=21.7 mPa·s

Vth=2.10V

VHR(25° C.)=99.0%

VHR(80° C.)=98.6%

Example 11

Prepared was a liquid crystal composition comprising:

| Component I | |
|---|---|
| 3-HEH-3 | 5.0% |
| 4-HEH-3 | 5.0% |
| 3-HHEH-3 | 3.0% |
| 4-HHEH-3 | 3.0% |
| 5-HHEH-3 | 4.0% |
| Component II | |
| 5-HB—CL | 6.0% |
| 3-HHB (F, F)—F | 5.0% |
| 5-HHB (F, F)—F | 5.0% |
| 3-HHB (F)—OCHF2 | 5.0% |
| 3-HHB (F, F)—OCHF2 | 5.0% |
| 3-HHB (F)—OCF3 | 6.0% |
| 3-HHB (F, F)—OCF3 | 6.0% |
| 3-DHB (F, F)—F | 5.0% |
| 3-HDB (F, F)—F | 5.0% |
| 5-HDB (F, F)—F | 5.0% |
| 3-H2DB (F, F)—F | 5.0% |
| Component III | |
| 3-HH-4 | 4.0% |
| 5-HH—O1 | 4.0% |
| 2-HH—EMe | 5.0% |
| 3-HH—EMe | 5.0% |
| 3-HHB-1 | 4.0% |

This composition had characteristics shown below:

$T_C$=81.4° C.

$T_L$<-20° C.

Δn=0.064

$\eta_{20}$=22.4 mPa·s

Vth=1.48V

Example 12

Prepared was a liquid crystal composition comprising:

| Component I | |
|---|---|
| 2-HHEH-3 | 4.0% |
| 3-HHEH-3 | 3.0% |
| 4-HHEH-3 | 3.0% |
| Component II | |
| 5-H2B (F)—F | 6.0% |
| 7-HB (F, F)—F | 6.0% |
| 3-HHB (F)—F | 6.0% |
| 4-HHB (F)—F | 6.0% |
| 3-HDB (F, F)—F | 5.0% |
| 5-HDB (F, F)—F | 5.0% |
| 3-HHEB—F | 4.0% |
| 5-HHEB—F | 4.0% |
| 3-HHCF2OB—F | 5.0% |
| 3-HHCF2OB (F)—F | 5.0% |
| 3-HHCF2OB (F, F)—F | 5.0% |
| 5-HHCF2OB (F, F)—F | 5.0% |
| Component III | |
| 3-HH-4 | 8.0% |
| 3-HB—O2 | 10.0% |
| 3-HB—O4 | 4.0% |
| 5-HHEBH-3 | 6.0% |

This composition had characteristics shown below:

$T_C$=93.1° C.

$T_L$<-20° C.

Δn=0.066

$\eta_{20}$=19.9 mPa·s

Vth=1.74V

Example 13

Prepared was a liquid crystal composition comprising:

| Component I | |
|---|---|
| 2-HEH-3 | 6.0% |
| V—HEH-3 | 6.0% |

-continued

| Component II | |
|---|---|
| 3-HHB (F)—OCHF2 | 4.0% |
| 5-HHB (F)—OCHF2 | 4.0% |
| 3-DHB (F, F)—F | 5.0% |
| 5-DHB (F, F)—F | 5.0% |
| 3-HDB (F, F)—F | 6.0% |
| 5-HDB (F, F)—F | 6.0% |
| 3-H2DB (F, F)—F | 6.0% |
| 3-HHBB—F | 5.0% |
| 5-HHEB—F | 5.0% |
| Component III | |
| 3-HH-4 | 6.0% |
| 3-HVH-3 | 4.0% |
| 2-HH—EMe | 7.0% |
| 3-HB—O2 | 4.0% |
| 3-H2B—O2 | 4.0% |
| 3-HB—O4 | 4.0% |
| 3-HHB-1 | 3.0% |
| 3-HVHB-1 | 5.0% |
| 3-HHB—O1 | 5.0% |

This composition had characteristics shown below:

$T_C$=83.1° C.
$T_L$<−20° C.
Δn=0.068
$\eta_{20}$=19.5 mPa·s
Vth=1.62V
VHR(25° C.)=98.8%
VHR(80° C.)=98.3%

Example 14

Prepared was a liquid crystal composition comprising:

| Component I | |
|---|---|
| 2-HHEH-3 | 4.0% |
| 3-HHEH-3 | 4.0% |
| 4-HHEH-3 | 4.0% |
| Component II | |
| 7-HB—F | 3.0% |
| 7-HB (F)—F | 3.0% |
| 5-H2B (F)—F | 4.0% |
| 7-HB (F, F)—F | 10.0% |
| 5-HB—CL | 5.0% |
| 3-HHB (F)—F | 5.0% |
| 4-HHB (F)—F | 4.0% |
| 3-HHB (F, F)—F | 7.0% |
| 4-HHB (F, F)—F | 7.0% |
| 5-HHB (F, F)—F | 6.0% |
| Component III | |
| 3-HH-4 | 10.0% |
| 7-HB-1 | 7.0% |
| 3-HB—O2 | 5.0% |
| 3-HHB—CL | 5.0% |
| 4-HBBH-3 | 3.0% |
| 4-HB (F) BH-3 | 4.0% |

This composition had characteristics shown below:

$T_C$=74.8° C.
$T_L$<−20° C.
Δn=0.063
$\eta_{20}$=17.4 mPa·s
Vth=1.87V
VHR(25° C.)=99.0%
VHR(80° C.)=98.5%

Example 15

Prepared was a liquid crystal composition comprising:

| Component I | |
|---|---|
| 3-HEH-3 | 3.0% |
| 4-HEH-3 | 3.0% |
| 3-HHEH-3 | 3.0% |
| V—HHEH-3 | 3.0% |
| Component II | |
| 7-HB—F | 4.0% |
| 5-HB—CL | 8.0% |
| 3-HEB—F | 5.0% |
| 3-HHB—F | 5.0% |
| V—HHB—F | 5.0% |
| 3-HVHB (F)—F | 5.0% |
| 3-HHB (F, F)—F | 8.0% |
| 5-HHB (F, F)—F | 3.0% |
| 3-HHEB—F | 5.0% |
| 3-HHEB (F)—F | 5.0% |
| 3-HHCF2OB (F, F)—F | 12.0% |
| 5-HHCF2OB (F, F)—F | 12.0% |
| Component III | |
| 3-HH-4 | 5.0% |
| 2-HH—EMe | 3.0% |
| 3-HH—EMe | 3.0% |

This composition had characteristics shown below:

$T_C$=87.0° C.
$T_L$<−20° C.
Δn=0.067
$\eta_{20}$=18.2 mPa·s
Vth=1.64V

Example 16

Prepared was a liquid crystal composition comprising:

| Component I | |
|---|---|
| 3-HHEH-3 | 4.0% |
| 4-HHEH-3 | 3.0% |
| 5-HHEH-3 | 3.0% |
| Component II | |
| 5-HCF2OB—F | 4.0% |
| 5-HCF2OB (F)—F | 4.0% |
| 5-HCF2OB (F, F)—F | 3.0% |
| 7-HB (F)—F | 4.0% |
| 5-H2B (F)—F | 8.0% |
| 7-HB (F, F)—F | 5.0% |
| 3-HHB (F, F)—F | 7.0% |
| 4-HHB (F, F)—F | 7.0% |
| 5-HHB (F, F)—F | 6.0% |
| 3-DHB (F, F)—F | 10.0% |
| 3-HDB (F, F)—F | 5.0% |
| V—HDB (F, F)—F | 5.0% |
| Component III | |
| 3-HH-4 | 3.0% |
| 3-HH—EMe | 7.0% |
| 4-HB (F) BH-4 | 4.0% |
| 3-HHEBH-3 | 4.0% |
| 5-HHEBH-3 | 4.0% |

This composition had characteristics shown below:

$T_C$=70.5° C.
$T_L$<−20° C.

Δn=0.062  
$\eta_{20}$=25.8 mPa·s  
Vth=1.32V

Example 17

Prepared was a liquid crystal composition comprising:

| Component I | |
|---|---|
| 3-HEH-3 | 3.0% |
| 4-HEH-3 | 3.0% |
| 3-HHEH-3 | 4.0% |
| 4-HHEH-3 | 4.0% |
| Component II | |
| 7-HB (F, F)—F | 3.0% |
| 3-HEB—F | 8.0% |
| 3-HEB (F)—F | 5.0% |
| 5-HEB (F, F)—F | 3.0% |
| 3-HHB (F, F)—F | 5.0% |
| 3-HVHB (F, F)—F | 5.0% |
| 3-HHB—OCF3 | 10.0% |
| 3-HHEB—F | 5.0% |
| 5-HHEB—F | 5.0% |
| 3-HHEB (F, F)—F | 5.0% |
| 4-HHEB (F, F)—F | 5.0% |
| 3-H2HEB (F, F)—F | 5.0% |
| Component III | |
| 3-HH-4 | 5.0% |
| V—HH-5 | 5.0% |
| 3-HH—EMe | 6.0% |
| 3-HHEBH-3 | 3.0% |
| 5-HHEBH-3 | 3.0% |

This composition had characteristics shown below:  
$T_C$=92.2° C.  
$T_L$<−20° C.  
Δn=0.059  
$\eta_{20}$=21.3 mPa·s  
Vth=1.91V

Example 18

Prepared was a liquid crystal composition comprising:

| Component I | |
|---|---|
| 3-HHEH-3 | 4.0% |
| 4-HHEH-3 | 4.0% |
| Component II | |
| 5-H2B (F)-F | 4.0% |
| 7-HB (F,F)-F | 6.0% |
| 5-HB-CL | 4.0% |
| 3-HHB (F,F)-F | 10.0% |
| 5-HHB (F,F)-F | 5.0% |
| 3-HHB (F)-OCHF2 | 5.0% |
| 3-HHB (F)-OCF3 | 10.0% |
| 3-HHB (F,F)-OCF3 | 6.0% |
| 3-DHB (F,F)-F | 8.0% |
| 3-HDB-F | 5.0% |
| 3-HHCF2OB (F,F)-F | 6.0% |
| 5-HHCF2OB (F,F)-F | 5.0% |
| 3-H2HCF2OB (F,F)-F | 5.0% |
| Component III | |
| 3-HH-4 | 5.0% |
| 3-HB-O2 | 5.0% |
| 3-HHEBH-3 | 3.0% |

This composition had characteristics shown below:  
$T_C$=79.8° C.  
$T_L$<−20° C.  
Δn=0.069  
$\eta_{20}$=24.0 mPa·s  
Vth=1.28V

Example 19

Prepared was a liquid crystal composition comprising:

| Component I | |
|---|---|
| 3-HHEH-3 | 3.0% |
| 4-HHEH-3 | 3.0% |
| 3-HHEH-5 | 3.0% |
| Component II | |
| 7-HB (F,F)-F | 10.0% |
| 3-HHEB-F | 5.0% |
| 5-HHEB-F | 5.0% |
| 3-HHEB (F,F)-F | 10.0% |
| 4-HHEB (F,F)-F | 3.0% |
| 5-HHEB (F,F)-F | 3.0% |
| Component III | |
| 3-HH-4 | 5.0% |
| 3-HH-1O1 | 5.0% |
| 3-HH-O1 | 5.0% |
| 5-HH-O1 | 5.0% |
| 2-HH-EMe | 5.0% |
| 3-HH-EMe | 15.0% |
| 3-HB-O2 | 5.0% |
| V-HVHB-1 | 6.0% |
| 5-HBBH-1O1 | 4.0% |

This composition had characteristics shown below:  
$T_C$=87.4° C.  
$T_L$<−20° C.  
Δn=0.062  
$\eta_{20}$=18.9 mPa·s  
Vth=2.24V  
VHR(25° C.)=99.0%  
VHR(80° C.)=98.6%

Example 20

Prepared was a liquid crystal composition comprising:

| Component I | |
|---|---|
| 3-HHEH-3 | 3.0% |
| 4-HHEH-3 | 3.0% |
| 3-HHEH-5 | 3.0% |
| Component II | |
| 7-HB-F | 5.0% |
| 3-HEB-OCF3 | 5.0% |
| 3-HHB-OCF3 | 10.0% |
| 3-HHEB-OCF3 | 5.0% |
| 5-HHEB (F)-OCF3 | 5.0% |
| 3-HHEB-F | 6.0% |
| 5-HHEB-F | 6.0% |
| 3-HHEB (F,F)-F | 10.0% |
| 4-HHEB (F,F)-F | 5.0% |
| 5-HHEB (F,F)-F | 5.0% |
| Component III | |
| 3-HH-4 | 6.0% |

-continued

| | |
|---|---|
| 3-HH-O1 | 5.0% |
| 5-HH-O1 | 5.0% |
| V-HH-4 | 5.0% |
| 3-HB-O2 | 8.0% |

This composition had characteristics shown below:

$T_C=92.1°$ C.

$T_L<-20°$ C.

$\Delta n=0.065$ $\eta_{20}=19.7$ mPa·s

Vth=1.99V

Effects of the Invention

The present invention has been able to provide a liquid crystal composition having particularly a high upper limit temperature of a nematic phase, a low lower limit temperature of a nematic phase and a small birefringence while satisfying general characteristics required for an AM-LCD.

What is claimed is:

1. A liquid crystal composition comprising a component I comprising at least one compound selected from the group of compounds represented by Formula (I-1) or (I-2), a component II comprising at least one compound selected from the group of compounds represented by Formulas (II-1) to (II-8) and a component III comprising at least one compound selected from the group of compounds represented by Formulas (III-1) to (III-5), and the composition does not contain any compound having a terminal CN group:

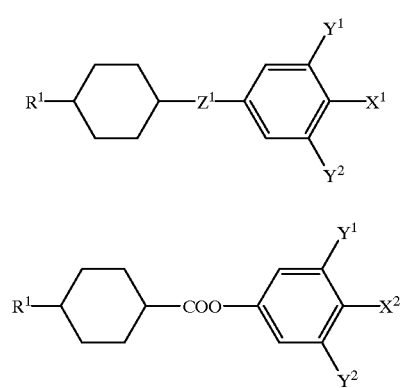

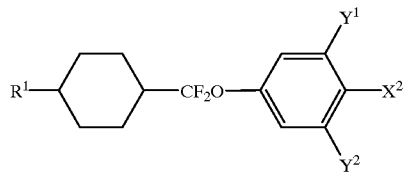

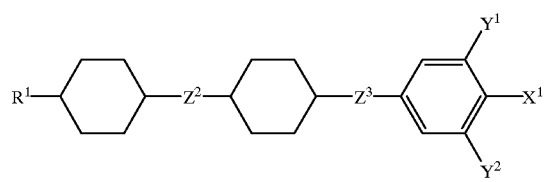

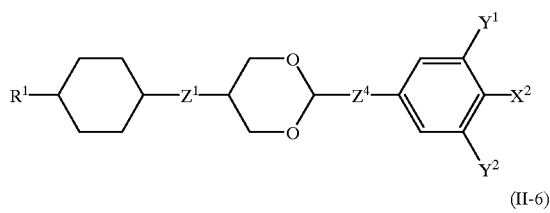

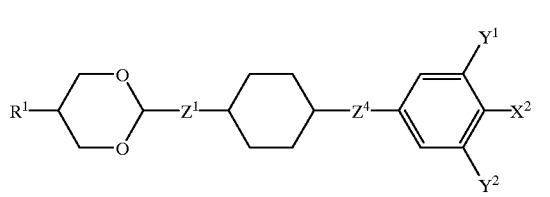

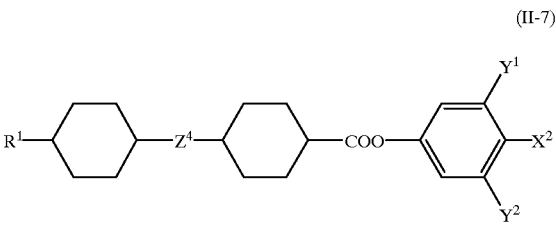

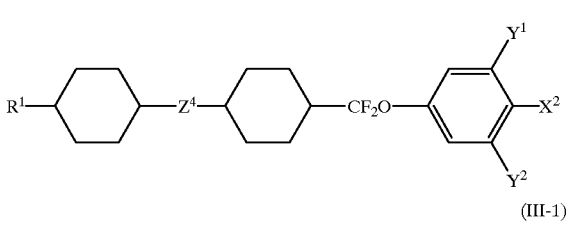

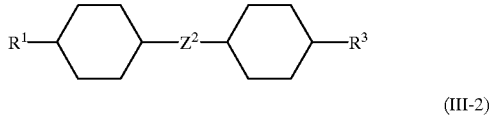

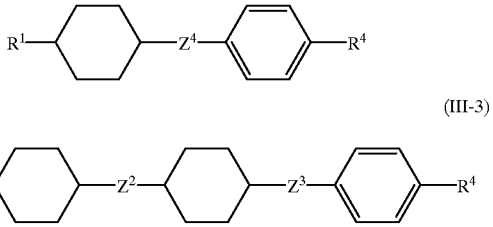

(III-4)

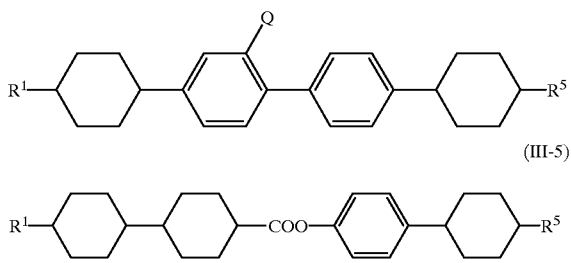

(III-5)

wherein $R^1$ and $R^2$ each represent independently an alkyl group, an alkoxy group, an alkoxymethyl group having 1 to 10 carbon atoms or an alkenyl group having 2 to 10 carbon atoms; $R^3$ represents an alkyl group, an alkoxy group, an alkoxymethyl group having 1 to 10 carbon atoms, an alkenyl group having 2 to 10 carbon atoms or —COO—$R^6$; $R^6$ represents an alkyl group having 1 to 10 carbon atoms; $R^4$ represents an alkyl group having 1 to 10 carbon atoms, an alkoxy group having 1 to 10 carbon atoms or an alkenyl group having 2 to 10 carbon atoms; $R^5$ represents an alkyl group, an alkoxy group, an alkoxymethyl group having 1 to 10 carbon atoms or an alkenyl group having 2 to 10 carbon atoms; $Z^1$ and $Z^4$ each represent independently a single bond or —CH$_2$CH$_2$—; $Z^2$ and $Z^3$ each represent independently a single bond, —CH$_2$CH$_2$— or —CH=CH—; $X^1$ represents F, Cl, OCHF$_2$ or OCF$_3$; $X^2$ represents F, OCHF$_2$ or OCF$_3$; $Y^1$ and $Y^2$ each represent independently H or F; and Q represents H or F.

2. The liquid crystal composition as described in claim 1, wherein the component I has a content of 3 to 30% by weight; the component II has a content of 5 to 80% by weight; and the component III has a content of 3 to 70% by weight each based on the whole weight of the liquid crystal composition.

3. The liquid crystal composition as described in claim 1, wherein a nematic phase has an upper limit temperature of 70° C. or higher, a lower limit temperature of −20° C. or lower and a birefringence of 0.075 or less.

4. A liquid crystal display comprising the liquid crystal composition as described in claim 1.

5. The liquid crystal composition as described in claim 2, wherein a nematic phase has an upper limit temperature of 70° C. or higher, a lower limit temperature of −20° C. or lower and a birefringence of 0.075 or less.

6. A liquid crystal display comprising the liquid crystal composition as described in claim 2.

7. A liquid crystal display comprising the liquid crystal composition as described in claim 3.

8. A liquid crystal display comprising the liquid crystal composition as described in claim 5.

* * * * *